April 16, 1935. W. H. FARR 1,998,047
METHOD OF LINING BRAKE DRUMS
Filed July 12, 1930  3 Sheets-Sheet 1

INVENTOR.
WARREN H. FARR
BY
John P. Tarbox
ATTORNEY.

April 16, 1935.  W. H. FARR  1,998,047
METHOD OF LINING BRAKE DRUMS
Filed July 12, 1930   3 Sheets-Sheet 3

INVENTOR.
WARREN H. FARR
BY
John P. Tarbox
ATTORNEY.

Patented Apr. 16, 1935

1,998,047

UNITED STATES PATENT OFFICE 1,998,047

METHOD OF LINING BRAKE DRUMS

Warren H. Farr, Detroit, Mich., assignor to Budd Wheel Company, Philadelphia, Pa., a corporation of Pennsylvania Application July 12, 1930, Serial No. 467,535

3 Claims. (Cl. 29—152.2)

The invention relates to brake drums and the like and a method of lining such drums by a suitable wear resisting lining to increase their life.

It is an object of the invention to provide such a drum in which a wear resisting liner is very intimately united with the main body of the drum so as to lock it thereto, and to provide an inexpensive and efficient method of so uniting the liner to the drum surface.

Liners of wear-resisting qualities have heretofore been applied to the braking face by various expedients, such as heating and shrinking in place, casting the brake drum onto the lining, and rolling the lining into the drum. None of these methods has produced a drum in which the lining and drum were intimately molecularly interlocked and at the same time, the face of the lining was accurately sized and trued at one and the same operation. Some of these methods required heat treatment either before or after application, and machining or other operations after the heat treatment to reduce the braking surface to true and accurate form and size. Others, not requiring heat treatment, did not accomplish the intimate interlock required to prevent loosening of the lining, before or after a period of use.

These difficulties are overcome and the objects of the invention attained by applying the lining to the surface to be treated and then hammering it so as to deform it internally to cause a molecular interlock between the surface of the lining and the brake drum proper, the hammering at the same time being carried out in a manner to cause a final surface on the lining which is a true cylindrical surface of revolution and accurately sized. To this end, the invention further comprehends the relative rotation of the work and the hammering means while the hammering is taking place, and, in order to balance the forces, the simultaneous hammering of opposed ends of a diameter of the work. The hammering at an instant takes place along a small arc or arcs, but the relative rotation of the work and hammering means results finally in a complete treatment of a surface of revolution, and a reduction to true and accurate size. To further aid in providing an interlock, the invention contemplates, in some instances, the preliminary roughening of the surface to be treated, either by forming depressions or elevations therein, or both with which a portion of the metal of the liner, when interiorly deformed by the hammering operation, is adapted to form a very secure interlock between the adjacent faces of the liner and drum to lock them against relative movement in all directions. This refinement of the invention is not necessary in all cases, since the hammering effects such an intimate molecular interlock between the molecules of the liner and the surface of the drum, as to preclude relative shifting under most normal conditions of usage. Also the surface of the sheets out of which brake drums are ordinarily formed have sufficient surface irregularities in most cases, to effect the interlock required without any additional roughening treatment such as is above specified. Another advantageous effect of the hammering is that it hardens the liner and thus increases its life.

The method may be used in making the drums originally or in relining used drums, or it may be used in operating upon other work, than brake drums, in which liners of this class are desirable.

In the accompanying drawings, there are illustrated more or less diagrammatically, several ways in which the method may be practiced, but it will be understood that the showing is merely illustrative, as it will be obvious to those skilled in the art that the invention is capable of being carried out in different ways.

Figure 1:
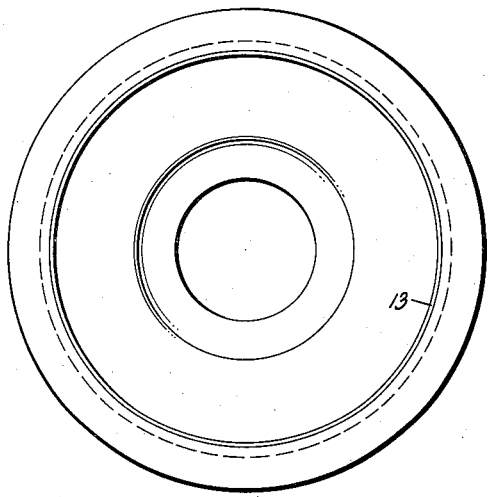
Figs. 1 and 2 are respectively an inside elevational view and an axial sectional view of a brake drum lined in accordance with the invention.
Figure 2:
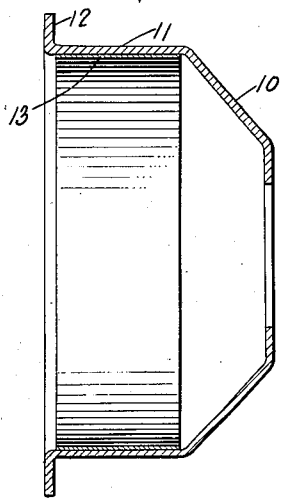
Figure 4:
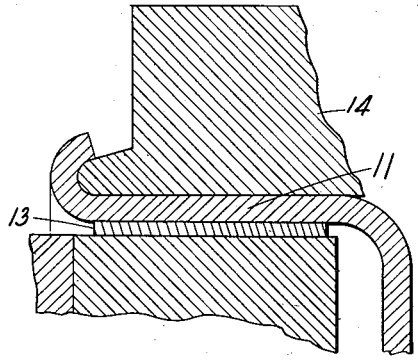
Figs. 4 and 5 are detail axial sectional views showing the work before and after being swaged in its relation to the adjacent parts of the swaging apparatus.

A form of brake drum resulting from the practice of the invention is shown in Figs. 1 and 2 as having the radially extending attaching flange 10, the outer peripheral cylindrical brake surface portion 11 and the stiffening edge flange 12. Within the inner peripheral surface of the portion 11 is shown secured the wear resisting lining 13 made of a material, such as high carbon steel having long wearing qualities. By the method this lining is securely locked against axial displacement or rotation, by the molecular interlock between the surface of portion 11 and the lining, even without preliminarily roughening the surface on portion 11. The surface of the metal, such as low carbon steel, out of which brake drums are ordinarily drawn has sufficient minor irregularities between the molecules thereof, to cause the molecules of the lining, under the heavy working effected in the process of hammering the lining in place by the improved method, to lock the lining securely in place by mechanical as well as molecular interlocking.

Figure 9:
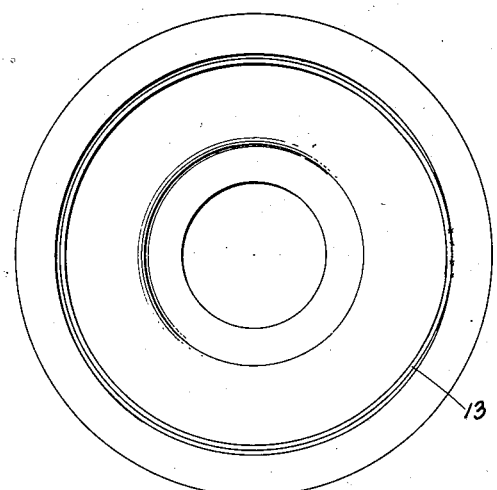
Fig. 9 is an inside elevational view showing one method of securing the liner in place before swaging it in place.

In the practice of my method, the lining 13 is in the form of an annulus, which may be continuous and formed by bending a flat strip into a hoop and butt welding the ends together or may be cut into a length to substantially fit the face of the drum which it is desired to line when bent into a hoop, is inserted, either in this welded together annular form, as shown, or in the form of an annulus having its ends abutting but not integrally joined, within the inner peripheral face of portion 11 of the drum, where it may be tacked in place by spot welds as shown in Fig. 9, to hold it in place preliminarily to the swaging operation.

Figure 3:
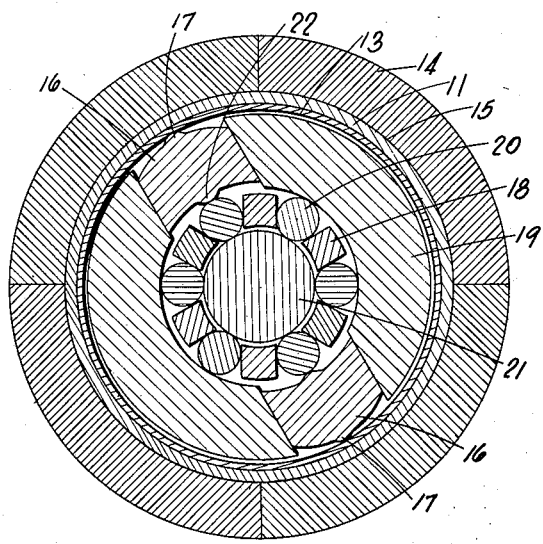
Fig. 3 is a transverse sectional view showing more or less diagrammatically, apparatus for swaging the lining in place in the inner peripheral face of the drum.
Figure 5:
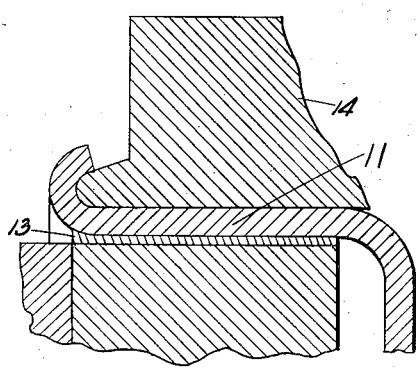

The assembled drum and lining is then placed in a swaging apparatus such as that shown in Fig. 3 comprising an outer series of work holding clamps 14 supporting the external peripheral surface of the work and acting as a substantially continuous anvil surface 15 backing up the said face of the drum under the hammer blows delivered to the interior peripheral surface of the lining by suitable means. Such means may comprise the radially movable hammers 16 having relatively narrow arcuate surfaces 17 to engage the work, and mounted in an annular swaging head 19 axially aligned with the work holding clamping means. Axially of the swaging head is arranged actuating means for the hammers comprising a shaft 18 adapted to be rapidly rotated in the head and carrying an annular series of rollers 20 arranged in spaced arrangement about the axis. The rollers 20 are also radially movable to a slight extent and are frusto-conical in form, and adapted to be supported on their inner sides and fed into the work, by a conical faced actuator 21. From an inspection of Fig. 3 it will be seen that when the work and swaging head are relatively rotated, and the shaft 21 is rotated, the rollers will successively engage the arcuate ribs 22 on the inner sides of the hammers and throw the same outwardly to deliver a succession of blows with great rapidity against the inner face of the lining to expand it around its entire circumference and to intimately interlock it with the face of the drum. The hammers are preferably arranged in pairs at opposite ends of a diameter and the pair of hammers so arranged is actuated simultaneously, to balance the forces around the axis. In Fig. 3, the actuator has been moved axially to hold the rollers in their outer positions, and the lining is being swaged to its final dimension, in which its inner surface is a true surface of revolution and of accurate diameter, its outer surface being molecularly and mechanically interlocked by the swaging operation with the face of the drum.

While it has been found ordinarily that a sufficiently strong interlock is obtained under all conditions of operation, without any pre-treatment of the surface of the brake drum to be lined, it may be desirable in some cases, to additionally roughen the surface against which the lining is swaged.

Figure 6:
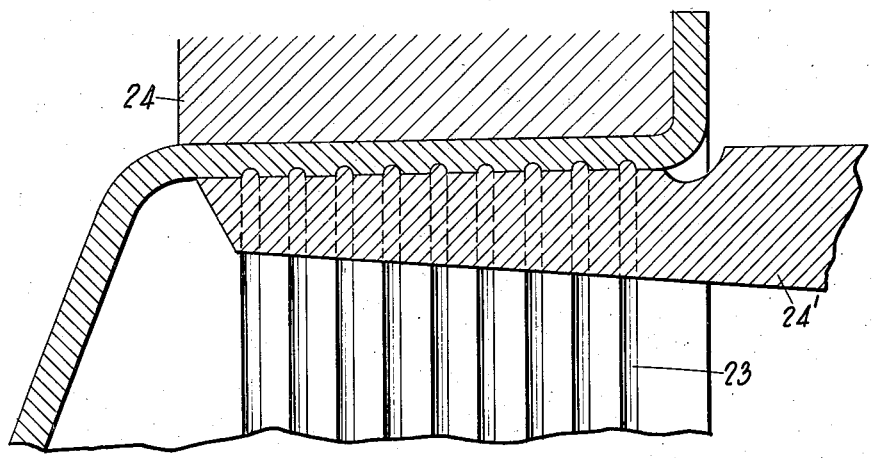
Figs. 6, 7 and 8 are detail axial sectional views of a modification involving the preliminary forming in the inner surface of the drum of annular depressions, Fig. 6 illustrating a tool acting on the work, Fig. 7 illustrating the liner in place before the swaging, and Fig. 8 illustrating the liner swaged in place.
Figure 7:
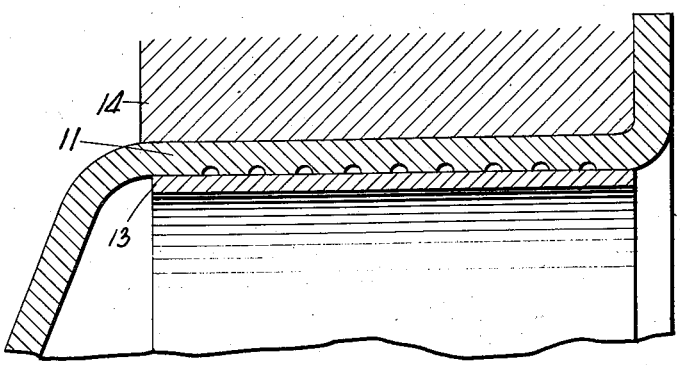
Figure 8:
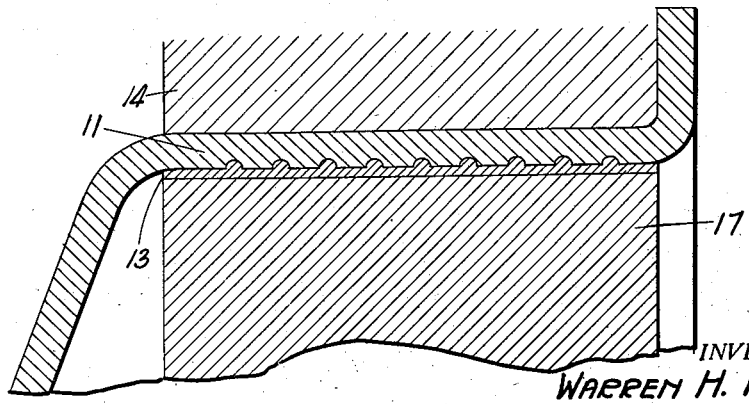

To carry out this feature, Fig. 6 shows the step of forming a series of annular grooves 23 in the inner peripheral face of the drum while rotating it in a work holder and the use of a cutting tool 24'. After the grooves have been formed, the lining is inserted, as shown in Fig. 7, and by the swaging operation illustrated in Fig. 8, it is expanded to fill the grooves, thus very securely locking it in place. The use of a tool, as 24', leaves a number of burs at the edge of the grooves which interlock mechanically with the lining to further lock the lining against rotation.

Figure 10:
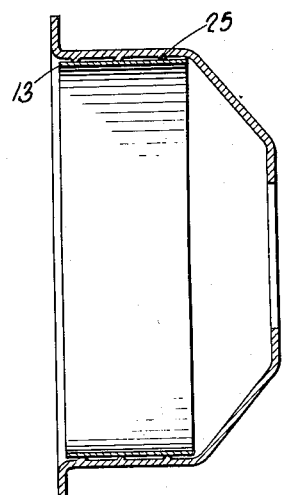
Fig. 10 is an axial section of a modified brake drum with the liner in place before swaging the liner in place.
Figure 11:
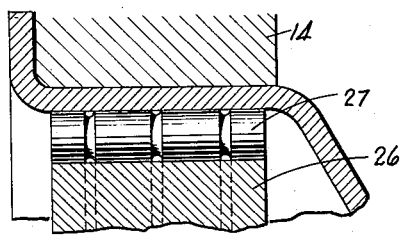
Figs. 11, 12 and 13 are detail axial sections illustrating the method used in forming the modified brake drum shown in Fig. 9 and in swaging it in place, Fig. 11 showing the step of forming the annular ribs on the inside face of the drum by swaging, Fig. 12 showing the lining in place before swaging it in place, and Fig. 13 showing the lining swaged in place.
Figure 12:
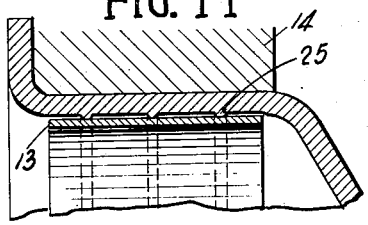
Figure 14:
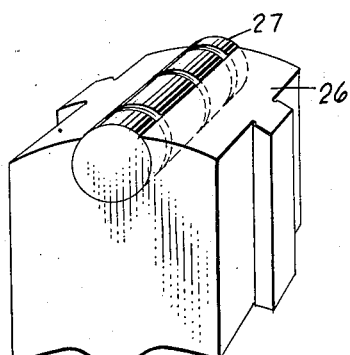
Fig. 14 is a detail perspective view of a hammer which can be used in the swaging operation shown in Fig. 11.
Figure 13:
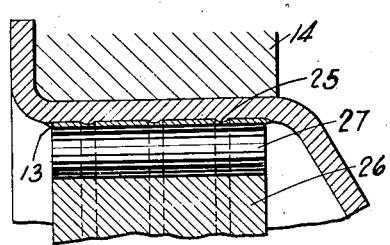
Figure 15:
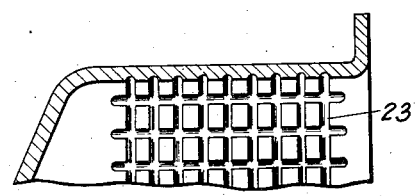
Fig. 15 is a detail view of a drum formed with both circumferential and axial depressions prior to the application of the lining.

According to the form of the invention shown in Figs. 9 to 13, the surface to be lined is preliminarily treated to form a series of annular ribs 25 in said surface, and this may be done by a swaging operation similar to the final swaging of the lining in place, but by the use of hammers 26 having a work engaging insert 27 grooved correspondingly to the ribs to be formed in the brake surface. Fig. 10 shows this preliminary swaging operation, Fig. 11 shows the insertion of the lining, and Fig. 12, the final swaging operation showing the lining swaged in place and interlocked with the ribs 25.

The particular manner in which the depression and projections are formed, and their direction and extent is immaterial for carrying out the broad features of the invention, and the specific means employed to form them and the specific grooves and ribs formed are merely illustrative of the apparatus which may be used and the form which the roughing of the surface may take, to produce a very effective additional interlock between the lining and brake surface.

While the invention has herein been described as applied to the lining of internal peripheral braking surfaces, it may also be applied to the lining of external peripheral surfaces, and other and further modifications and differentiations may be employed by those skilled in this art without departing from the spirit and scope of the invention as defined in the claims appended hereto.

What I claim is:

1. The method of lining brake drums which comprises applying a liner to the brake cylinder and simultaneously cold swaging said liner to the cylinder over small areas at opposite ends of successive diameters along substantially the total axial depth of the liner, while relatively rotating the work and hammering the liner and the cylinder together to intimately unite and interlock them in all directions against displacement tendencies of the braking operation.

2. The method of locking a brake lining to a brake cylinder against braking-displacing effects, and simultaneously hardening the braking surface of the lining to resist braking wear, which comprises telescoping the lining and the cylinder into snug fitting relation, setting up a rotary motion about the cylinder axis, and deriving from the rotary motion an annular series of simultaneous oppositely directed reactionary rectilinear radial blows successively about said axis on small areas of the braking side of the lining.

3. The method of assembling a brake surface liner to a brake drum and locking the liner to the drum cylinder against peripheral and axial displacement from the cylinder, which comprises providing the cylinder with shoulders resisting such displacement, setting up a rotary motion about the drum axis, deriving repeated equal and opposite sets of radial forces from said rotary motion, and utilizing the forces of said set to effect hammer blows over small areas of the braking surface to harden it and to lock the liner to the drum cylinder relative to said shoulders.

WARREN H. FARR.